Jan. 17, 1967  T. R. CROM  3,298,670
ROTATING DIGESTIVE COVERS
Filed Feb. 11, 1964  10 Sheets-Sheet 2
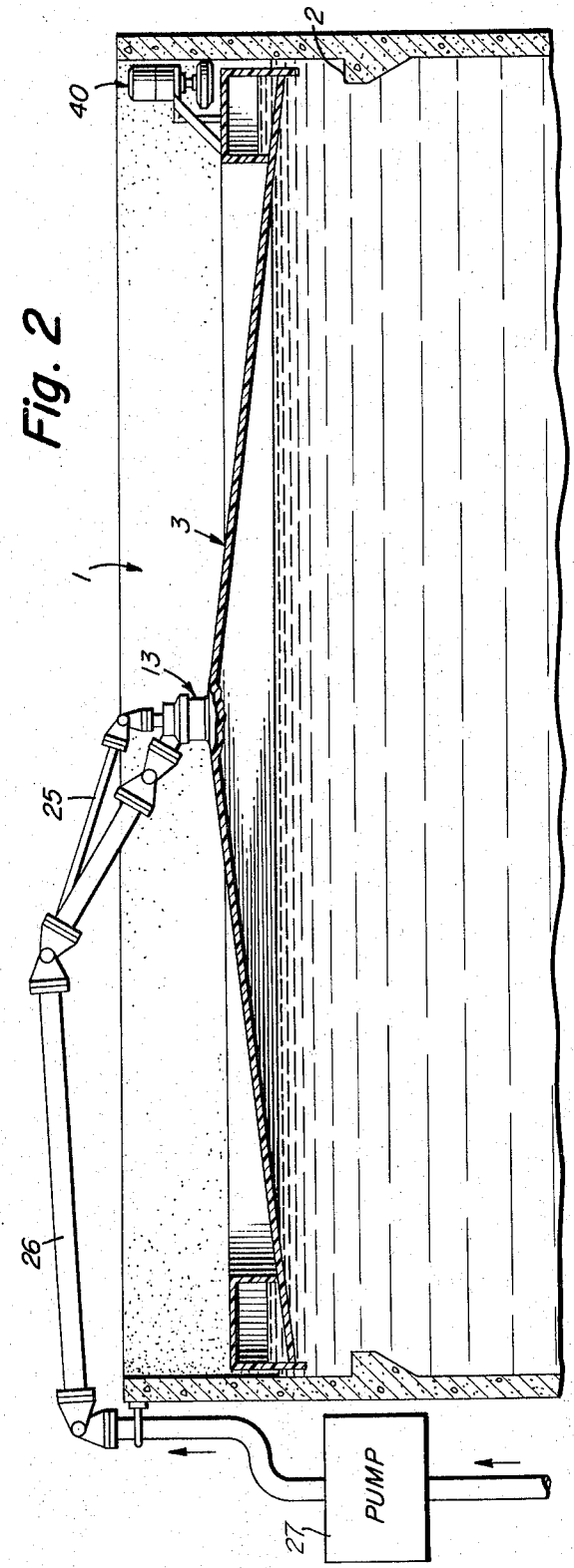
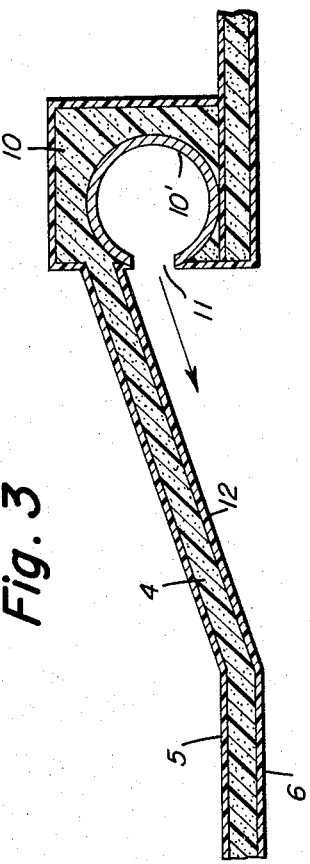
INVENTOR
Theodore R. Crom
BY Stevens, Davis, Miller & Mosher
ATTORNEYS

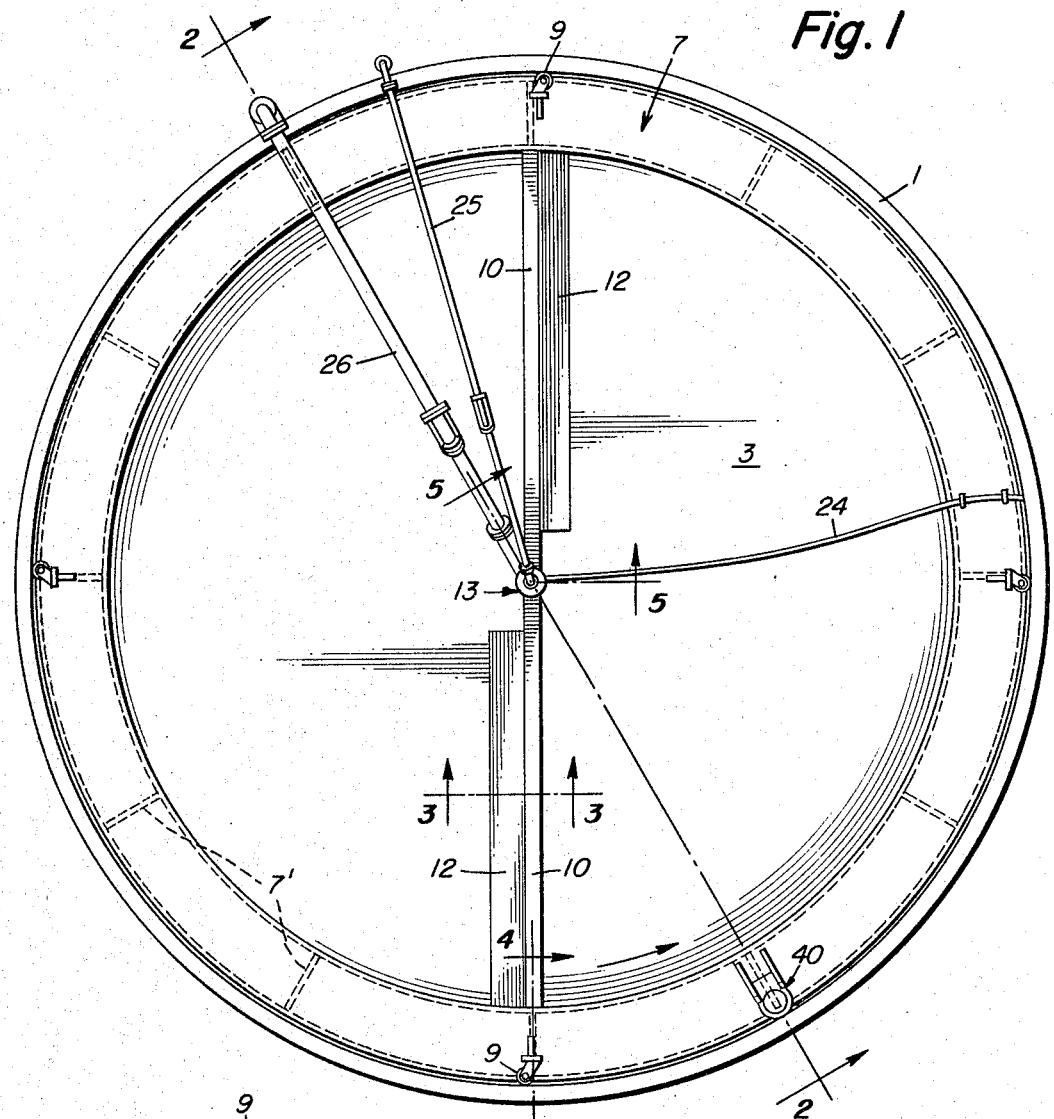
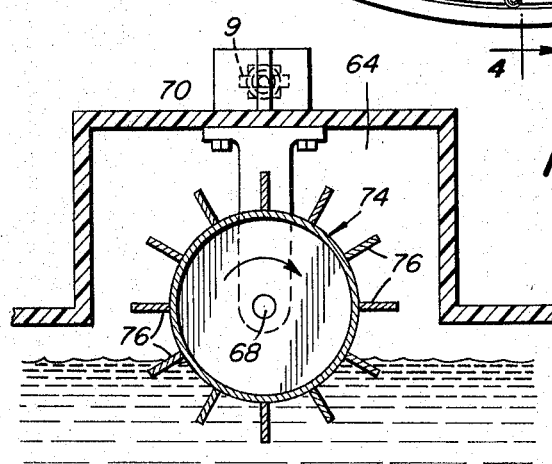
Fig. 1
Fig. 18
INVENTOR
Theodore R. Crom

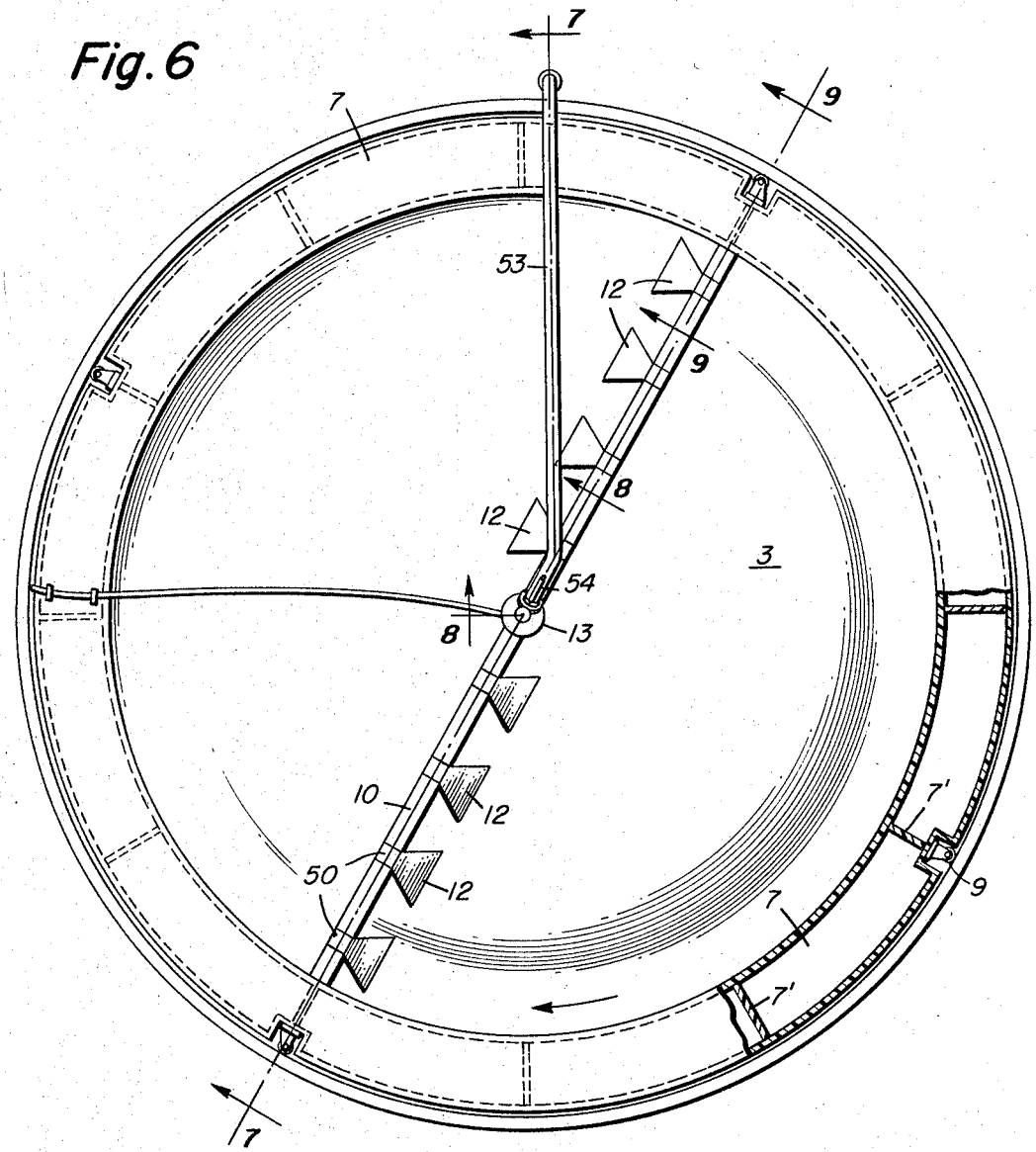

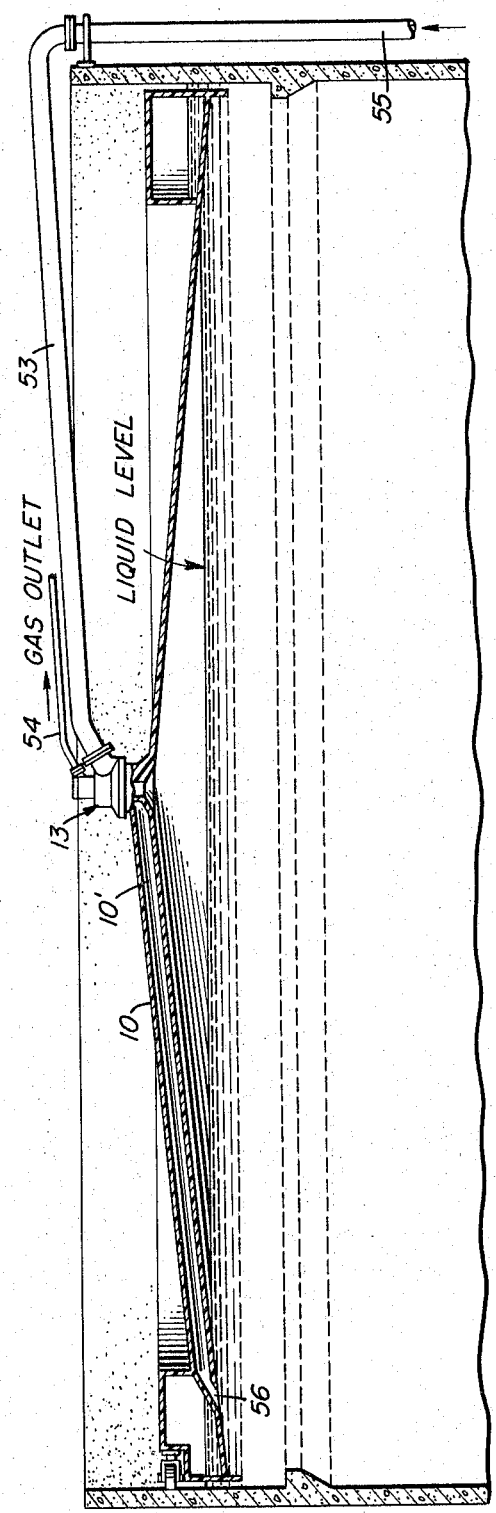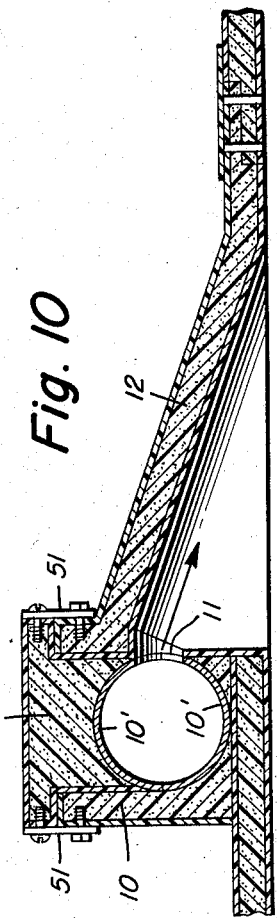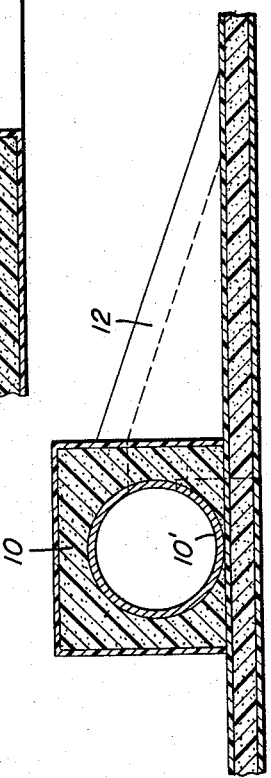

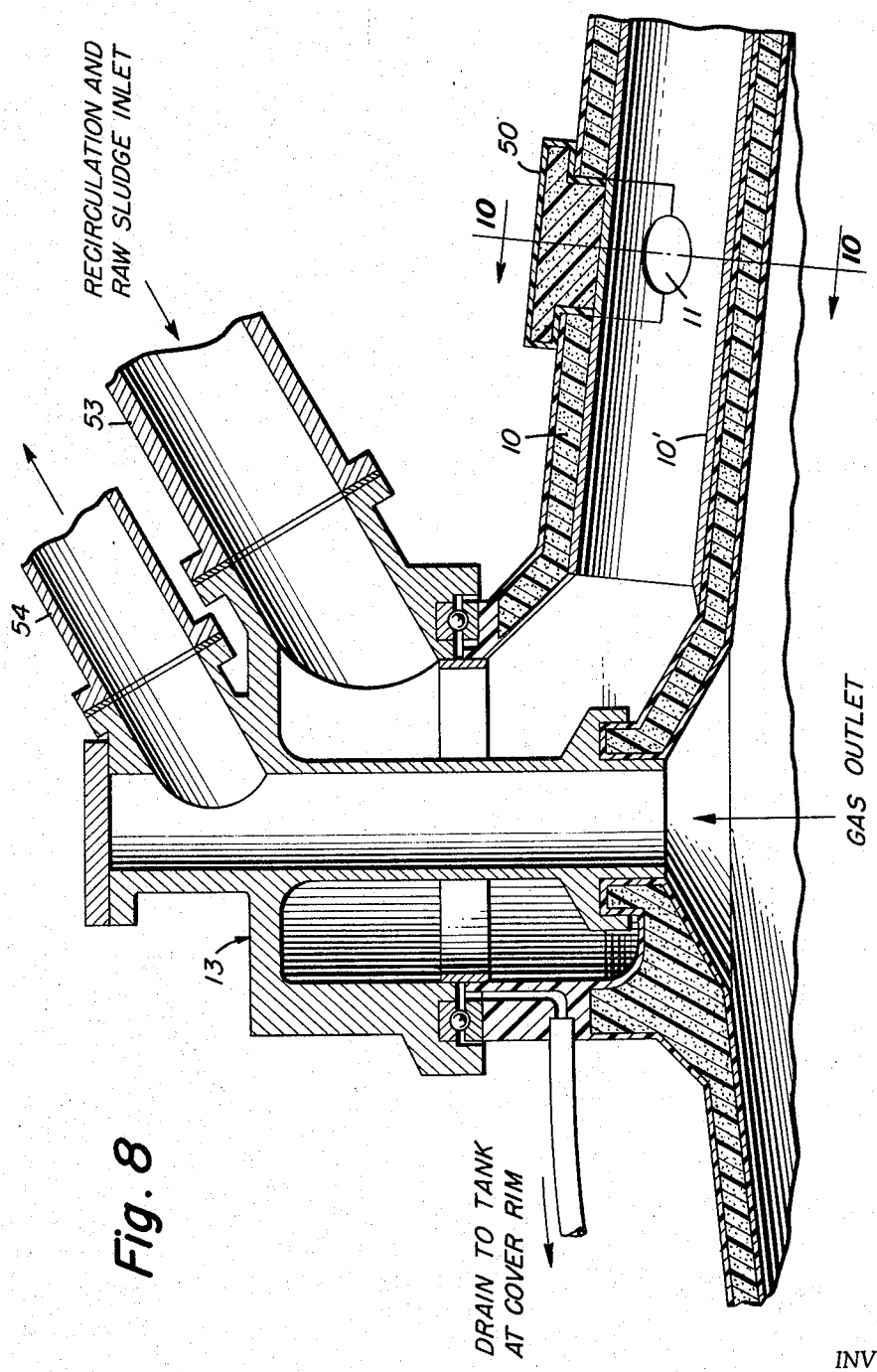

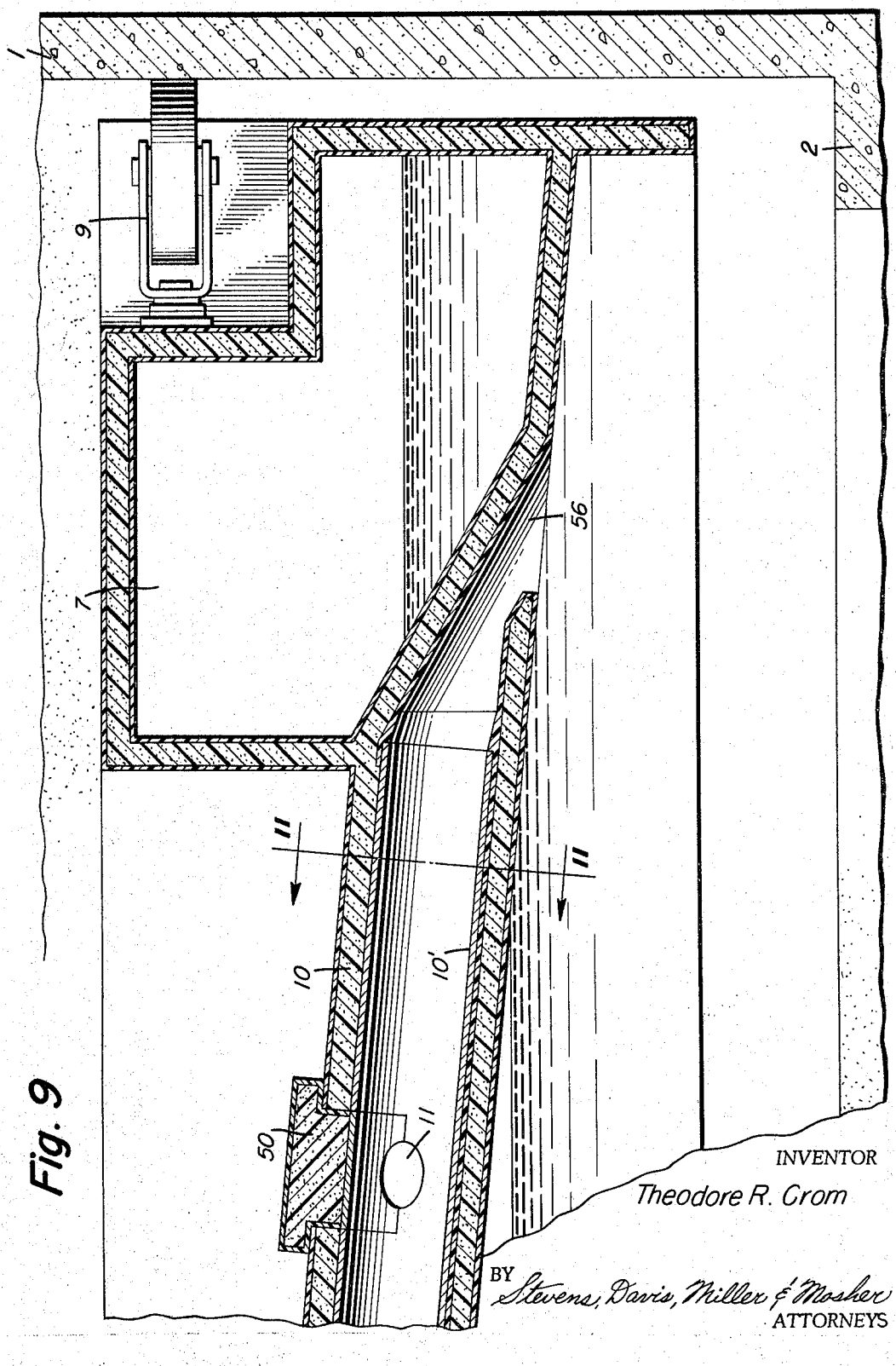

Jan. 17, 1967     T. R. CROM     3,298,670
ROTATING DIGESTIVE COVERS

Filed Feb. 11, 1964     10 Sheets-Sheet 8

INFLUENT

INVENTOR
Theodore R. Crom

BY
Stevens, Davis, Miller & Mosher
ATTORNEYS

INVENTOR
Theodore R. Crom

Jan. 17, 1967  T. R. CROM  3,298,670
ROTATING DIGESTIVE COVERS
Filed Feb. 11, 1964  10 Sheets-Sheet 10

INVENTOR
*Theodore R. Crom*

BY
*Stevens, Davis, Miller & Mosher*
ATTORNEYS

United States Patent Office 3,298,670
Patented Jan. 17, 1967

3,298,670
ROTATING DIGESTIVE COVERS
Theodore R. Crom, 212 SE. 1st St.,
Gainesville, Fla. 32601
Filed Feb. 11, 1964, Ser. No. 344,096
30 Claims. (Cl. 259—5)

This invention relates to rotating floating covers for waste digestion tanks.

Within waste digestion tanks, the sludges, which are heavier than water, settle to the bottom of the tanks where they undergo anaerobic fermentation of organic matter. During the fermentation process, gases are liberated, and said gases are entrapped within and cause flotation of the sludge particles. The sludge particles rise to the surface of the liquor in the digestive tank to the underside of the floating cover. At the surface of the waste material, the particles are only partially submerged in the liquor and they form a material known as scum. As the scum density increases at the surface of the water, it is subjected to the drawing action of the gases which also rise from the surface. As this action continues, the scum blanket will build deeper and deeper, lifting the cover from the liquid surface. In that a portion of the scum blanket is no longer submerged in the fluid, that portion is not subject to the digestion or fermentation action taking place within the liquor. Over a long period of time, the blanket can develop to such a thickness that it seriously hampers the operations of the digester and considerably reduces its capacity and efficiency.

Consequently, it is highly desirable to prevent the formation of the scum blanket. Numerous methods of preventing the scum blanket have been developed, but apparently none is totally without disadvantages and shortcomings which hamper effective operation.

A very common method used for scum removal is called "gas recirculation." The gas formed during fermentation is collected in a gas dome at the top center of the cover. The gas is compressed and forced back into the bottom of the digester well below the scrum blanket. As the gas rises quickly from the bottom to the surface of the liquor, it agitates the scum blanket to such an extent that the gases entrapped in said scum are released, and said scum sinks to the bottom and comes under the influence of the fermentation process. This method is fairly effective at points where the gas is injected into the digester; however, it is quite difficult to inject gas into the liquor at all points around the underside of the surface, and hence there are areas of scum remote from said gas bubbling up through the liquor. Said scum remains on the surface of said liquor where it again hampers effective operation.

Another method of breaking up the scum blanket is to recirculate the contents of the digester. Piping is so arranged that a vertical riser extends up into the gas film at the top center of the tank. The recirculating sludge in the influent to the tank spills from the top of said pipe within the gas film, splashing and breaking up the scum blanket near the center of the tank. Obviously, this method would not remove scum from areas remote from the recirculating pipes.

Another prior method of breaking up the blanket is by introducing rotating mechanisms with long paddle arms which agitate the scum blanket. This method of breaking up the scum blanket is fairly satisfactory for smaller diametered tanks. But, regardless of the size of the tanks, the paddles require considerable maintenance in order to be effective.

Other problems found in the prior art are (1) the contents of the digester tanks must be heated to approximately 95° F. in order that the anaerobic digestion does not go "sour." This means that the anaerobic bacteria cannot function at low temperatures; and therefore, to maintain optimum temperature in the digester it is necessary that insulation be provided, (2) covers made of steel or similar type metals are known to be subject to corrosion due to the exposure of the cover surfaces to the atmosphere and acids, and (3) steel covers have been known to sink causing obvious problems.

Therefore, it is an object of this invention to provide a rotating digester tank cover which floats on the top surface of the tank content and incorporates means to break up the scum blanket.

It is another object of this invention to provide a rotating, floating tank cover provided with means for urging the scum contents to the center of the tank where said scum is broken up by influented material.

It is another object of this invention to provide a top with radial arms through which recirculated material is pumped to cause rotation of said top and the effective breaking up of said scum blanket.

It is another object of the present invention to provide a digester tank cover which is free from corrosive effects of the material in said tank.

It is another object of the invention to provide a digester tank cover which also affords excellent insulating characteristics.

It is another object of the invention to provide a digester tank cover which is sturdy but light in construction and therefore affords easy installation and maintenance.

Another object of the invention is to provide a floating digester tank cover of single thickness design, with a non-metallic shell and foam core sandwich arrangement, which is impossible to sink even if entirely submerged.

Yet another object of the invention is to provide a floating tank cover with a plurality of ballast tank compartments which afford a variable submerged dimension to the cover depending upon the amount of fluid in the compartments.

Another object of the invention is the provision of a digester tank with external recirculating piping.

Other features and objects of the invention will become apparent from the following detailed description of the drawings in which:

FIGURE 1 is a top view of one embodiment of the invention;

FIGURE 2 is a section taken along lines 2—2 of FIGURE 1;

FIGURE 3 is a section of the radial arms mounted on the top side of the cone cover taken along lines 3—3 of FIGURE 1;

FIGURE 6 is a plan view partially in section of a modification or another embodiment of the invention;

FIGURE 7 is a sectional elevation taken along lines 7—7 of FIGURE 6;

FIGURE 8 is a sectional elevation of the inlet and outlet manifold section taken along lines 8—8 of FIGURE 6;

FIGURE 9 is a sectional elevation taken along lines 9—9 of FIGURE 6;

FIGURE 10 is a sectional of the jet structure taken along lines 10—10 of FIGURE 8;

FIGURE 11 is a sectional of the sludge guide tube taken along lines 11—11 of FIGURE 9;

FIGURE 18 is a sectional taken along lines 18—18 of FIGURE 16.

Figure 4:
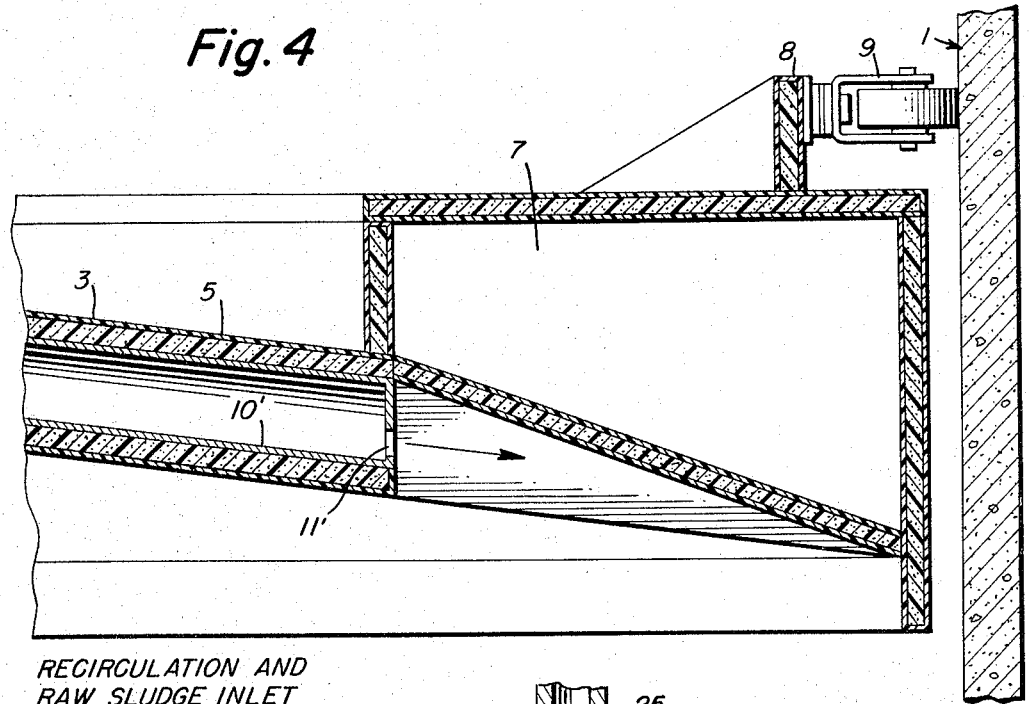
FIGURE 4 is a sectional view of the casters and ballast tanks taken along lines 4—4 of FIGURE 1.

Referring now to the embodiment shown in FIGURES 1–5, there is shown a digester tank 1 which can be made of prestressed construction, brick, or any other suitable material. The diameter of said tank may be of any size, and the contents thereof emitted therein by any known or conventional means. Any conventional or known fermentation or treatment means (not shown) are located substantially at the bottom of said tank 1. Top or cover 3 is provided at substantially the top of tank 1 and is fabricated from reinforced plastic materials such as polyester resins in combination with epoxy and other resins resistant to the attack by the tank contents. The cover can be of any suitable shape such as dome-shaped, flat, or cylindrical. By way of example, as can be seen in FIGURE 2, cover 3 is cone-shaped and in the absence of material in tank 1 rests on ledges 2 provided in the walls of tank 1. Cover 3 comprises main cone deck 5 and under cone deck 6, said cone decks being made of non-metallic material such as fiberglass. Sandwiched between said cone decks is a foam-type core 4, said core being made of a material such as urethane (see FIGURE 3).

A ballast tank 7, better shown in FIGURE 4 is located around the periphery of cover 3 and comprises a plurality of isolated compartments defined by partition 7'. However, the ballast means could be located at any suitable position with respect to said cover, and if desired, can be made removable and of uniform size regardless of cover dimensions. Each compartment is adapted to be filled with fluid for a purpose to be described below. Supports 8 are rigidly secured at various points on said ballast tank 7 and rotatably support spacing casters 9, said casters being made of non-corrosive material such as neoprene. Said casters 9 provide for proper cover-wall spacing when said cover is being rotated or moved vertically.

Mounted radially along the top deck 5 of cover 3 are radial, hollow arms 10 with rearwardly facing elongated openings 11 and angled directing plates 12. Said elongated openings 11 are defined by a suitable non-corrosive tube member 10' mounted within arm 10. Opening 11' is located at the radial end of tube 10'. Manholes and sampling wells could be incorporated in the top cover 3 as required, but since they are conventional, they are not shown in the figures.

Figure 5:
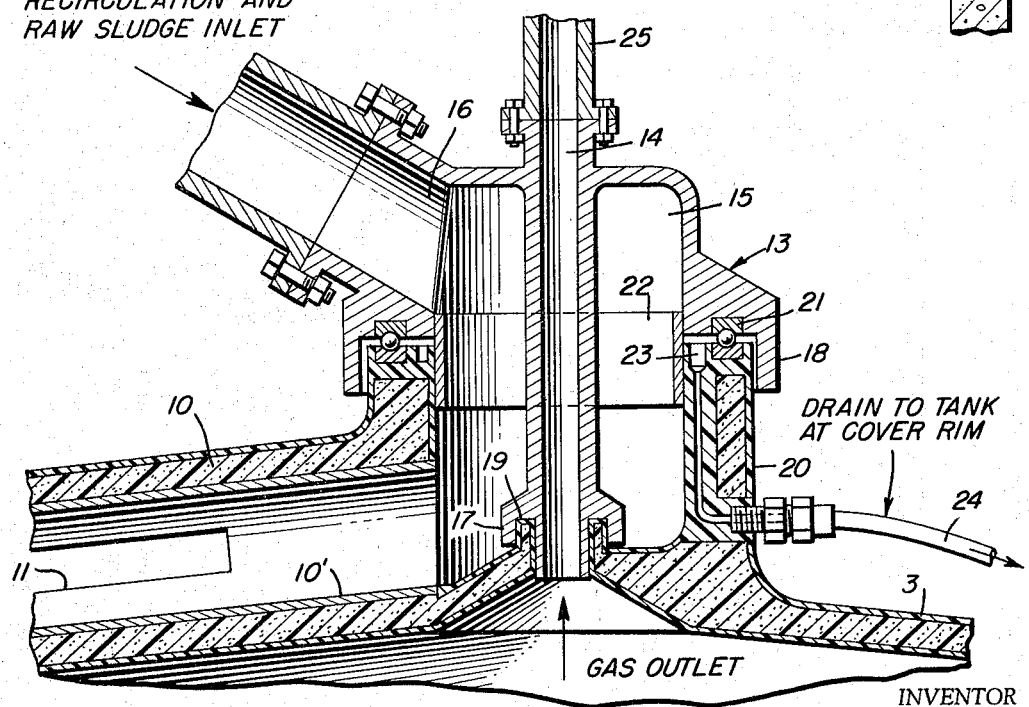
FIGURE 5 is a sectional view of the gas outlet and recirculation sludge inlet manifold section taken along lines 5—5 of FIGURE 1.

Located at the apex of the cone-shaped cover 3 is a rotatably mounted manifold section 13, better seen in FIGURE 5. The stationary portion of the manifold section can be made of a suitable noncorrosive material, such as fiberglass or any other such material. Located in the vertical center of said manifold section 13 is gas outlet tube 14 surrounded by sludge chamber 15. Recirculation or raw sludge inlet 16 associates with chamber 15 and distribution arm 10. Inner flange 17 and outer flange 18 of the manifold section 13 cooperate with upturned tube-like member 19 and upturned tube-like member 20 of the cover 3 to ensure constant association between manifold section 13 and said cover 3. Bearings 21 provide for frictionless rotation between said cover 3 and said manifold section 13.

Seal 22 prevents any sludge leakage between the manifold section 13 and cover 3; however, a drain channel 23 and drain tube 24 are provided to drain raw sludge that happens to pass through the seal back into the digester tank. (See FIGURE 1.) Drain tube 24 could be adapted to selectively pass fluid to moisten, seed, warm, and agitate the bit of scum which might form in the space between the cover rim and tank wall, thereby reducing or eliminating that scum.

Gas line 25 is connected to gas outlet 14 for the purpose of removing gases which accumulate under cover 3 from tank 1. Said gas line 25 is adapted to include conventional pressure and vacuum relief valves (not shown). Influent pipes 26 are connected to and associate with inlet 16, and raw sludge, recirculated sludge, or supernatant is forced therethrough by pump means 27, which can be any conventional type. Pipe 26 and line 25 are provided with rotatable joints to enable the cover 3 to move vertically and tilt to some degree. If desired, pipe 26 and line 25 could be made of flexible hose to permit cover movement without the need of joints.

The operation of the digester cover shown in FIGURES 1 to 5 will now be described. Waste material enters the digester tank 1 by conventional means (not shown). As the level of said material rises above the ledges 2 and the surface thereof contacts cover 3, said cover 3 begins to float on the top surface of said material due to its light weight and buoyancy. The fermentation process begins at the bottom of tank 1, and pump means 27 is energized. Ballast tank compartments 7 are filled with water to a desired level to select the height of cover 3 that rides above the surface of the waste material. At no time, however, will the level of the waste material be above the top surface of the said ballast tanks 7. When snow or other material causes an unequal distribution of forces on the top of cover 3, the partitions 7' prevent the ballast water from flowing to the lowered end thereof and causing excessive tilting of the cover. Due to the sandwich fiberglass and foam core arrangement of said cover 3, it is impossible for said cover 3 to sink even if completely submerged under the material in tank 1. Furthermore, the fiberglass sandwich arrangement and foam core provide for excellent insulation to maintain an optimum operating temperature in tank 1 under prevailing conditions.

Sludge or supernatant is recirculated through pipe 26 and is kept under pressure by pump 27 and enters recirculation inlet 16, chamber 15, and distribution arms 10. As the cavity in arms 10 is filled with raw sludge, the pressure exerted on said sludge forces said sludge to the rear of said arms through openings 11. Sludge is also forced radially through opening 11' and is directed downward by the sloping bottom of ballast tank 7. The rearward and axially moving sludge creates such force as to churn or agitate the top surface of the material in tank 1. The rearward forcing of the sludge also causes an opposite rotation of the entire cover 3 so that the entire top surface or area of the material in tank 1 is agitated as the cover rotates.

After the fermentation process has been in operation for a length of time, the scum blanket attempts to be formed as described above. However, the agitation of the top surface breaks up said scum blanket and causes the scum particles to fall to the bottom of tank 1 and to come under the influence of the fermentation process. Because the scum blanket is kept warm and moist by the influent material, said influent material can function to provide anaerobic bacteria to the top surface of the material in tank 1. The scrum blanket will then be digested as well as agitated so that its formation is prevented. Thus, the influent material performs the function of agitating moistening, warming, and seeding the surface of the material within the tank. Gas is released by the fermentation process and the breaking up of the scum blanket and rises to the top apex of said cover 3 and escapes through the gas outlet 14 and consequently out through gas line 25.

The centralized spacing of said cover 3 is maintained by the Neoprene spacing casters 9.

Thus there has been described the efficient, easily installed, advantageous rotating digester tank top cover which effectively breaks up the above described scum blanket, causes digestion of said scum blanket, provides for good insulation, and avoids corrosive effects on the cover and the recirculating pipe means.

Referring now to the embodiment of the invention disclosed in FIGURES 6–11, the same character references are used to refer to similar structural elements. In FIGURES 6–11, there is disclosed a similar type of tank cover 3, again utilizing the ballast tanks 7 and the tank partitioning means 7'. Again, radial hollow arms 10 extend from the manifold section located in the center of the cover out to substantially the periphery of the cover 3. As shown in FIGURES 10 and 11, hollow tube 10' is mounted within arms 10 and has a plurality of spaced openings or jets 11 located at the rear portion thereof. Downwardly extending directing plates 12 cooperate with openings or jets 11 to aid in the directing of the rearwardly forced raw sludge. Plugs 50 are removably secured to the radial arm 10 at locations substantially in the vicinity of jets 11 by any conventional securing means, such as bolt means 52 and plate means 51. When maintenance is to be performed on jets 11, the bolt means 52 are dismantled and the plugs 50 are removed to afford easy access to jets 11. For this purpose, the portions of tube member 10' in the vicinity of jets 11 and plugs 50 are integral with the plugs 50 and are removed therewith.

The sludge is recirculated by the over-the-wall piping system 55 which connects to flexible pipe 53, which can be made of any suitable plastic or flexible material, said flexible pipe 53 being supported by any conventional frame-like structure, such as a catwalk (not shown). The terminal end of pipe 53 communicates with the inlet chamber of the manifold section 13 in the same manner as described above. The manifold section cooperates with the radially extending arms 10 and as the sludge is forced therethrough by the pump means, pressure will build therein to eventually force sludge through the openings or jets 11 in a rearward and downward direction. Jets 11 direct the moving sludge downward to perform the warming, moistening, seeding and agitation functions. Tube 10' also terminates in a radially-directed aperture 56, so that the pressurized sludge can be forced therethrough in a like manner as described above. If desired, aperture 56 could be made to face in a rearward direction. As gas accumulates in the upper apex underneath the cover 3, the gas passes through the gas outlet of manifold 13 to the gas outlet pipe 54, which can also be of a flexible or plastic material and supported by the same framework that supports flexible pipe 53.

Thus, as the scum blanket is broken up at the surface of the liquor, the top cover 3 floating thereon rotates in an opposite direction as that assumed by the recirculated sludge.

It is to be understood that a power driven wheel bearing against the inside wall of the tank can be mounted on the floating digester cover for augmenting the rotational forces imparted to said cover. Thus, the rate of rotation of the cover can be varied without the necessity of varying the speed of operation of the recirculating pump means 27. An example of such an arrangement is generally shown as drive wheel assembly 40 in FIGURES 1 and 2.

Figure 12:
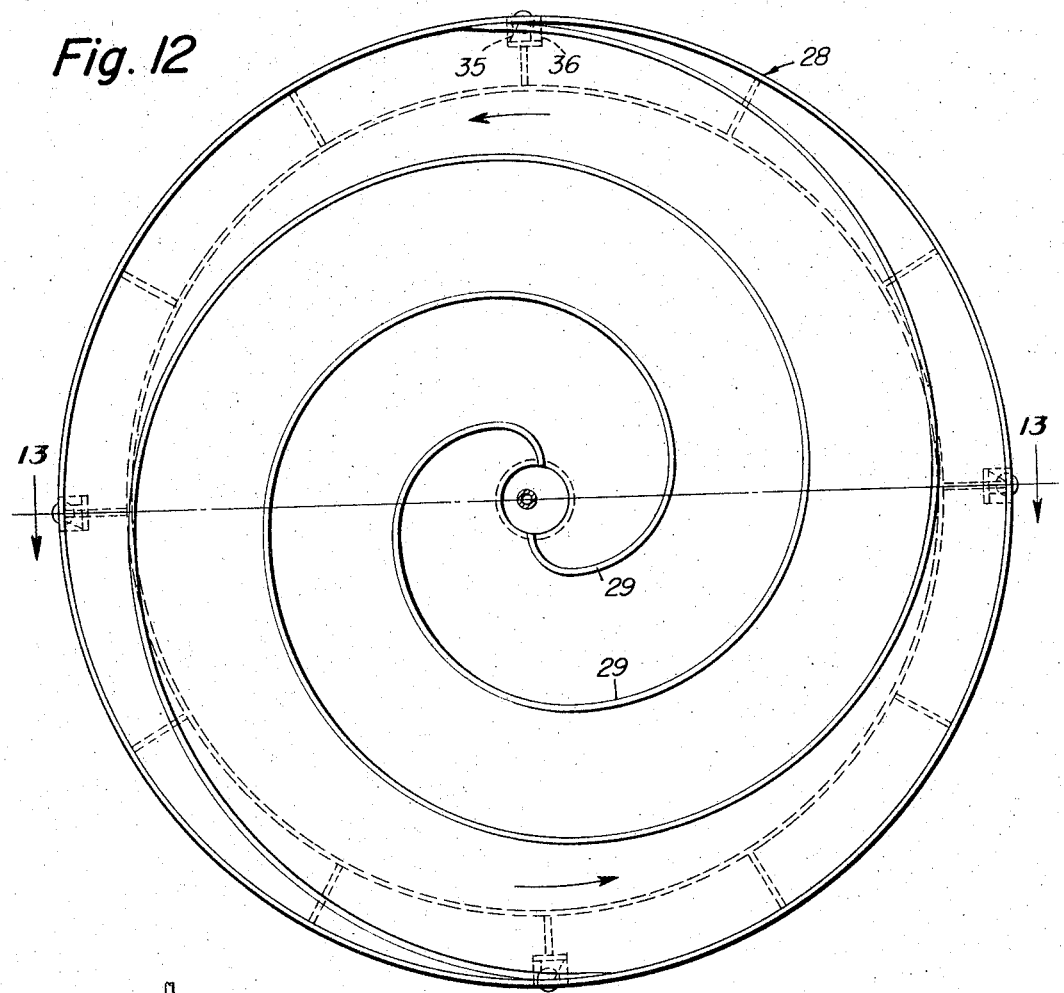
FIGURE 12 is a bottom plan view of another embodiment of the invention. The tank is not shown in this figure for the purpose of retaining clarity in the figure.
Figure 13:
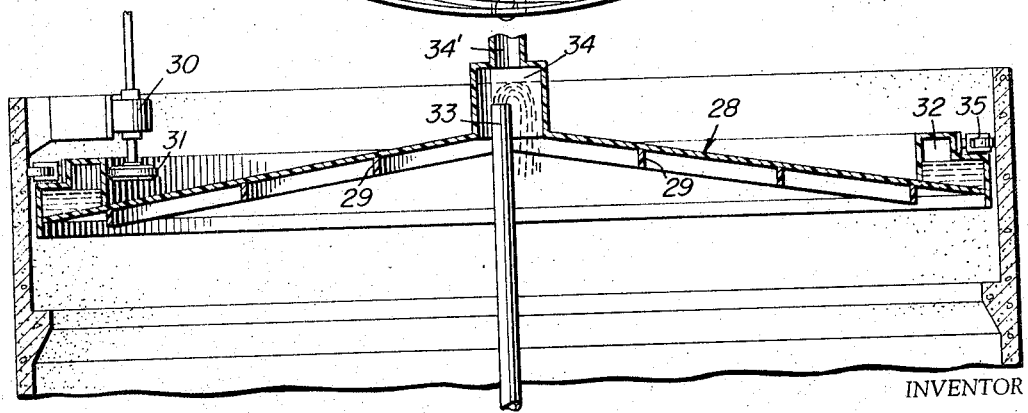
FIGURE 13 is a sectional elevation taken along lines 13—13 of FIGURE 12. The tank is shown in this figure to show the relationship between the cover and the structural elements of the tank.

Referring now to the embodiment of the invention shown in FIGURES 12 and 13, the cover 28 has the same basic construction of a main cone deck and under cone deck and a foam core sandwiched between the said two decks. However, dependingly located from the undersurface of said cover 28 there are mounted a plurality of spiral vanes 29 extending from the center of said cover to the outside of said cover 28. Upstanding ballast means 32 are located around the periphery of the outside top surface of cover 28, and said means are adapted to be driven or rotated by friction driver 31 powered by conventional motor 30. A gas dome or cavity 34 is found at the top center of said cover 28 and allows for gas accumulation and space for a centrally located influent pipe 33. Gas removal outlet 34' associates with said dome 34 and allows gas to be removed through a gas outlet pipe (not shown).

Space casters 35 are mounted within cavities 36 formed within the ballast tank 32 so that the cover 28 can be frictionally rotated by said motor 30 and friction driving means 31.

In operation, top cover 28 floats on the surface of the material within tank 1, and said cover is rotated by motor 30 and friction driving means 31 in the angular direction as shown by the arrows of FIGURE 12. During the fermentation process, the scum blanket attempts to be formed; however, said scum blanket is urged, scooped or forced to the center region of the top surface in tank 1. When said scum is in the center of tank 1, it is broken up by the influent material issuing from the influent pipe 33 and the particles thereof fall to the bottom of tank 1 to come under the influence of the fermentation process. The gases released are collected in dome 34 and are emitted through the gas removal outlet 34' and removed from tank 1. Thus there is a positive collecting of an entire scum blanket and the breaking up of said scum blanket at the center of tank 1.

The vertical dimension of vane 29 can be of any suitable height, and said vane can be made of any nonmetallic material that could withstand the influence of the waste material in tank 1. The angular rotation of cover 28 can be of any suitable rate.

Figure 14:
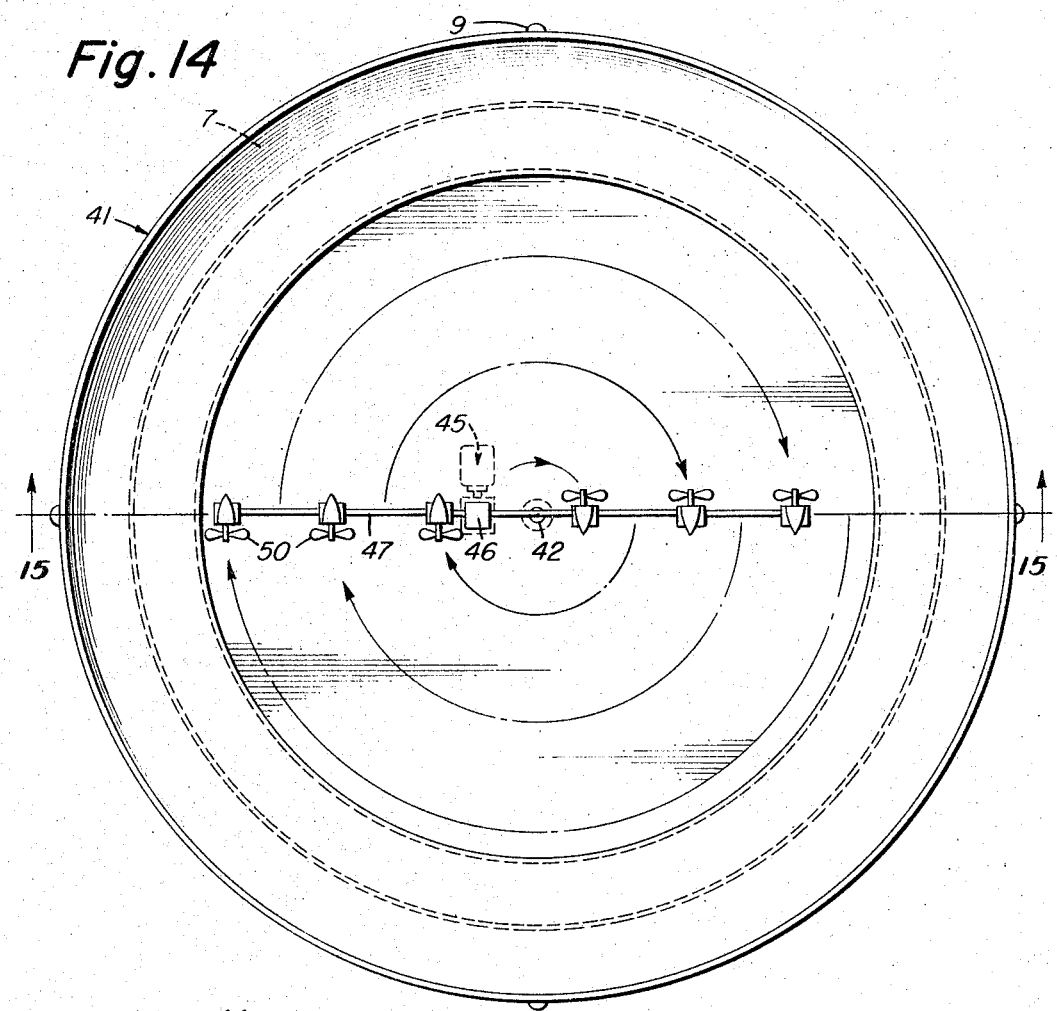
FIGURE 14 is a bottom plan view of still another embodiment of the invention.
Figure 15:
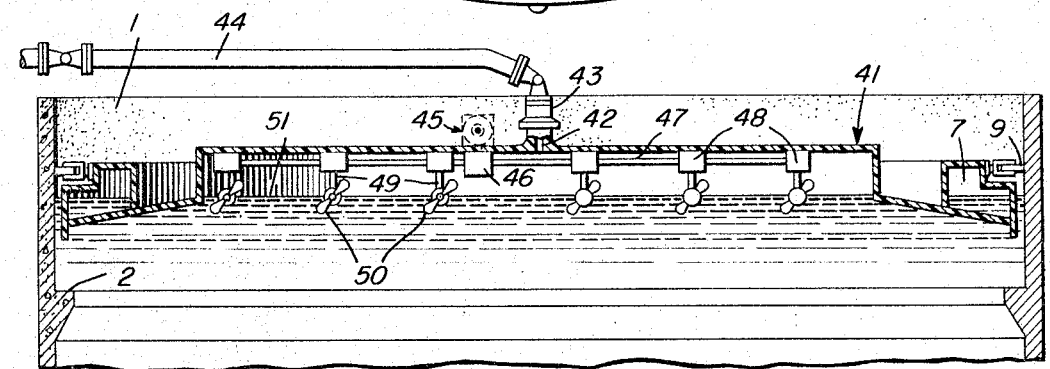
FIGURE 15 is a sectional view taken along lines 15—15 of FIGURE 14 showing the cover in relation to the other elements of the tank.

Referring now to the embodiment shown in FIGURES 14 and 15, there is shown another embodiment of the invention.

Digestive cover generally indicated as 41 has the same basic sandwich construction as described above and has a cone-shaped cross section with an upstanding cylindrical portion disposed at the top thereof. Gas outlet 42 is disposed at the center of the cylindrical section of cover 41 and rotatbly communicates with gas outlet pipe 43 and gas removal pipe 44. Compartmented ballast tanks 7 are disposed about the periphery of cover 41 and cavities are defined therein for the mounting of spacing casters 9. A conventional drive motor and gear system generally indicated as 45 is mounted on the top of cover 41 and substantially in the center thereof. A transverse shaft member 47 extends across the substantially entire dimension of the cylindrical cavity and is connected to the drive system by a gear coupling within gear box 46. The shaft 47 is also geared to vertical shafts located within hollow tube or downshaft members 49 and provides drive forces therefor transmitted through gearing within gear boxes 48. A plurality of propeller or blade means 50 are mounted at the bottom ends of tube members 49. The blade means on one side of shaft 47 face in one common direction while the blade means on the opposite side of shaft 47 face in an opposite common direction. Blade means 50 are rotated by a driving force imparted to the blade means 50 through the shafts within vertically disposed tube members 49. All gear boxes are conventionally sealed to prevent waste material from contacting the enclosed gears.

In operation, the scum blanket attempts to be formed at the surface 51 of the material within tank 1. Compartmented ballast means 7 is filled with water or fluid so that the blade means 50 are disposed substantially at the scum line 51 of the material within tank 1. Drive means 45 is energized and rotates bar 47 which in turn provides drive forces for blade means 50. The rotation of blade means 50 causes a churning or agitation of the surface 51 of the material upon which cover 41 floats. As such churning or agitation takes place, blade means 50 also imparts a rotating force to cover 41 for rotating entire cover 41. It will be noted that the spacing of the blade means from center is staggered such that the agitated areas defined by the rotating blade means 50 overlap. Thus as the cover rotates, the blade means effectively agitates the entire top surface of the material within tank 1. The scum forming thereon is therefore broken up and falls to the bottom of the digester tank. The gases released the from the scum particles are removed from the cylindrical portion of the cover through gas outlet means 42, gas outlet pipe 43, and gas removal pipe 44.

Figure 16:
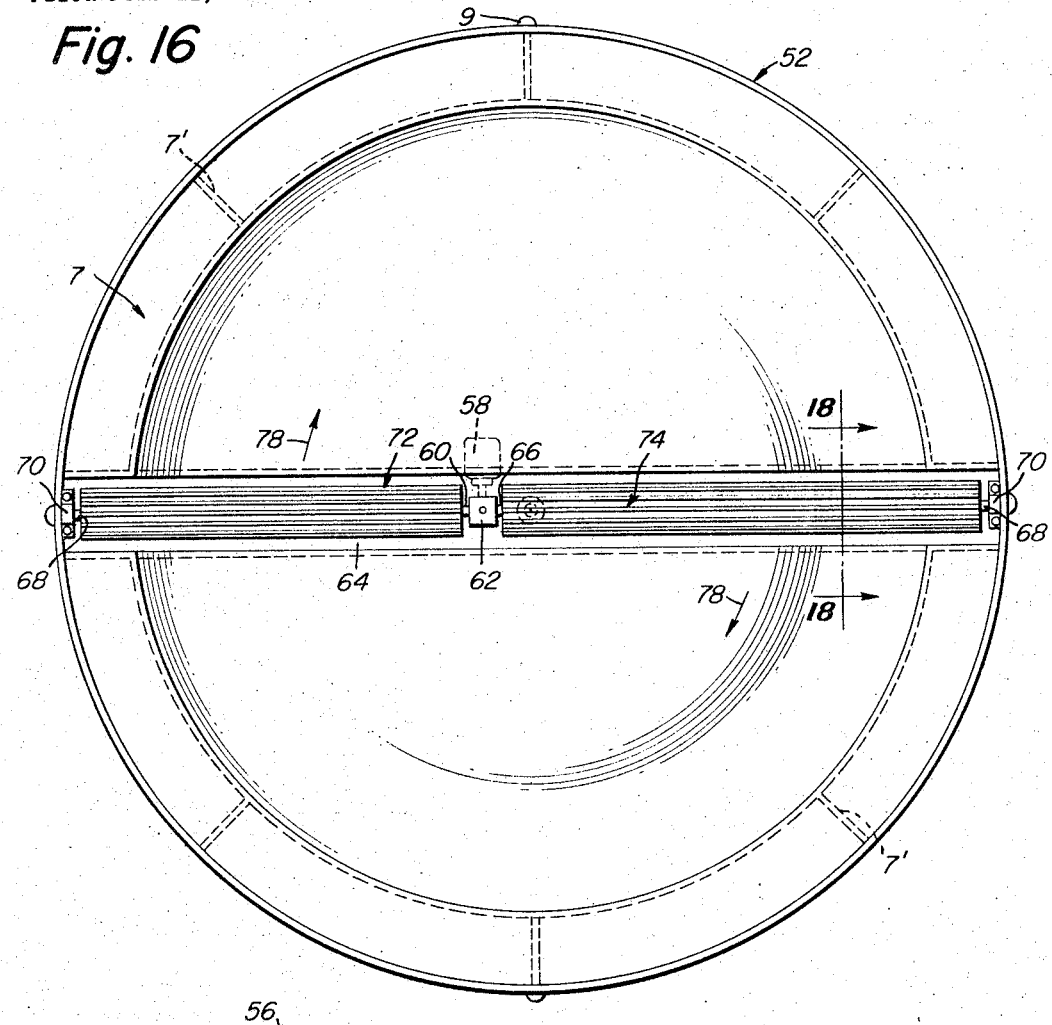
FIGURE 16 is a bottom plan view of still another embodiment of the invention.
Figure 17:
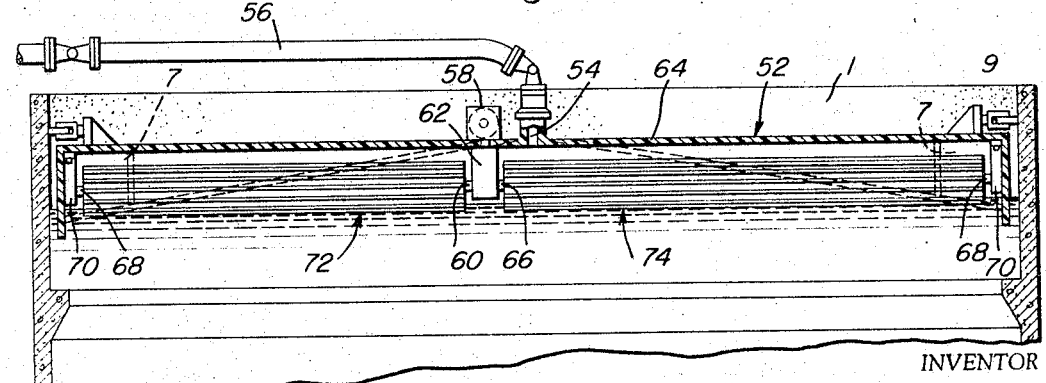
FIGURE 17 is a sectional elevation of the embodiment shown in FIGURE 16. The cover is shown in operable association with the tank and gas removal pipe.

Referring now to the embodiment shown in FIGS. 16–18, there is shown generally a digestive cover 52 with compartmented ballast tanks 7, and a gas outlet 54 located at the top of the cover. Casters 9 mounted on the cover maintain centralized spacing for the cover, and gas removal pipe 56 rotatably communicates with gas outlet 54. A conventional motor 58 is mounted on cover 52 and powers a vertical shaft which is geared to two horizontally disposed shafts 60 and 66, and said vertical shaft rotatably driving shafts 60 and 66 in opposite directions. Gear box 62 functions to protect the enclosed gears (not shown) from the waste material in tank 1 and said box 62 comprises the conventional and necessary seals (not shown). Cover 52 is generally cone shaped; however, a transverse rectangular section 64 is provided in the cover 52 to house two elongated paddle wheels 72 and 74 having inner ends mounted on shafts 60 and 66 and the outer ends supported by shafts 68. Brackets 70 rotatably support shafts 68. Paddle wheels 72 and 74 are comprised of a plurality of radially disposed blades or paddles 76 mounted on a cylindrical drum (see FIG. 18), said paddles being disposed parallel to the axis of the drums and having substantially the same lengths as said drums. Paddle wheel 72 is somewhat shorter in length than paddle wheel 74 because of the off-center position of gear box 62; however, each said paddle wheel is substantially the length of a radius of cover 52.

Ballast tanks 7 are filled with the appropriate amount of fluid to determine the submerged level of cover 52 in the material within tank 1. As the scum blanket tends to form at the surface of the material, motor 58 drives shafts 60 and 66, and consequently paddle wheels 72 and 74, in opposite directions. The rotating blades 76 on paddle wheels 72 and 74 churn and agitate the top surface of the waste material and cause rotation of the entire cover 52 in the direction of arrows 78. Thus, the substantially entire surface of the waste material is agitated. Since paddle wheel 74 is greater in length than the radius of cover 52, no unagitated area will exist in the center of the waste surface.

It is to be undesrtood that preferred embodiments of the invention have been disclosed and that obvious modifications thereof can be made without departing from the spirit of the invention. The invention should be only limited by the scope of the appended claims.

What is claimed is.

1. In a digester tank in which material is to be deposited, the material characterized by a tendency of a scrum blanket to form at the surface thereof, a floating tank cover, means for rotating said cover, means mounted on said cover for agitating the scum which tends to form over substantially any area of the surface of the material within the tank, whereby the substantially entire surface is kept free of accumulated scum.

2. In combination with a digester tank, a floating tank cover, pipe means mounted on said cover for recirculating influent material, said floating tank cover adapted to be rotated whereby the influent material emitted from said pipe means agitates the scum which tends to form over substantially all areas of the surface of material within the tank.

3. A digester tank as set forth in claim 2, said cover having an upper non-metallic layer, a lower non-metallic layer, and a layer of foam-like material disposed between said upper and lower layers.

4. A digester tank as set forth in claim 2, wherein said cover is substantially cone shaped.

5. A digester tank as set forth in claim 4, said cover comprising gas outlet means disposed substantially at the apex of said cone.

6. A digester tank as set forth in claim 2, wherein means for varying the exposed height of said cover above the material in the tank are mounted on said cover.

7. A digester tank as set forth in claim 6, said height varying means comprising a ballast tank.

8. A digester tank as set forth in claim 7, wherein said ballast tank comprises a plurality of isolated compartments disposed around the periphery of said cover.

9. In a digester tank, a tank cover positioned in said tank and adapted to rotate therein comprising a cone-shaped surface, at least one hollow radial arm disposed in said surface, and said arm having at least one laterally directed opening through which recirculated material can be forced to cause said cover to rotate in response to influent material forced through said opening.

10. In a digester tank as defined in claim 9, manifold means having an inlet chamber communicating with said arms, recirculating means for feeding influent material to said manifold means whereby said influent material is forced through said inlet chamber, said arms, and said opening.

11. A digester tank as set forth in claim 10, wherein said cover is adapted to float on material located within the tank and said cover is adapted to rotate in response to the forces imparted thereto by the influent material.

12. A digester tank as set forth in claim 10, wherein said arm has at least two restricted openings.

13. A digester tank as set forth in claim 10, wherein said opening is an elongated slot disposed along substantially the entire length of said arm and directing means disposed in proximity to said opening for downwardly directing material emitted through said opening.

14. A digester tank as set forth in claim 10, wherein said influent material moistens, warms, seeds and agitates at least a portion of the surface of the material within the tank.

15. In a digester tank in which waste material is deposited, the material characterized by a tendency of scum material to form at the surface thereof, a tank cover having an upper non-metallic layer, a lower non-metallic layer, and a layer of foam-like material disposed between said upper and lower layers so that the cover floats on the surface of the material within the tank, said cover having a substantially cone-like shape, a gas opening located substantially at the apex of said cover, a ballast tank located on said cover, said ballast tank comprising a plurality of isolated compartments, said compartments adapted to contain a fluid, spacing means mounted on said cover for providing minimum spacing between the edges of said cover and the walls of the tank when said cover is stationary, rotating, and moved vertically, at least one hollow arm radially mounted on said cover, opening means through which influent material can be forced communicating with said hollow arm, directing means disposed in proximity to said opening means for downwardly directing at an acute angle to the horizontal material forced through said opening means, manifold means having an inlet chamber communicating with said hollow arm and gas outlet means communicating with said gas opening, influent feeding means for feeding influent material to said inlet chamber of said manifold means, and gas removing means connected to said gas outlet means of said manifold means, whereby the forces exerted on the influent material by said influent feeding means force influent material through said opening means in said hollow arm and the influent material emitted therethrough agitates the surface of the material within the tank to prevent the formation of scum material on the surface thereof and causes rotation of said tank cover.

16. In a digester tank as defined in claim 15, wherein said opening means comprises a plurality of jets, said directing means comprises a plurality of plates, and said cover further comprising a plurality of plug means mounted in said arm in proximity to said jets for allowing access to said jets.

17. In a digester tank as defined in claim 15, wherein said opening means comprises an elongated slot and said directing means comprises an elongated plate.

18. In a digester tank as defined by claim 15, wherein said tank further comprises drive wheel means mounted on said cover for imparting rotational forces to said cover, said wheel means positioned to engage the inner walls of the tank.

19. In a digester tank in which waste material is deposited, the material characterized by a tendency of scum material to form at the surface thereof, a tank cover having an upper non-metallic layer, a lower non-metallic layer, and a layer of foam-like material disposed between said upper layer and said lower layer so that the cover floats on the surface of the material within the tank, said cover having a substantially cone-like shape, a gas dome located substantially at the apex of said cover, a gas opening located substantially at the top of said dome, a ballast tank on said cover, said ballast tank comprising a plurality of isolated compartments, said compartments adapted to contain a fluid, said ballast tank having a plurality of cavities, spacing means mounted within said cavities for providing minimum spacing between said cover and the walls of the tank, spiral means depending from the lower surface of said cover for forcing the scum material to a central location of the tank when said cover is rotated, rotating means for rotating said cover, pipe means for emitting material at the surface of the material within the tank and above the central location, whereby the scum material forced to the central location is broken up by agitation caused by the emitted influent material and the gas released therefrom is collected in said gas dome and is removed through said gas opening.

20. In a digester tank in which waste material is deposited, the material characterized by a tendency of scum material to form at the surface thereof, a tank cover having an upper non-metallic layer, a lower non-metallic layer, and a layer of foam-like material disposed between said upper and lower layers so that the cover floats on the surface of the material within the tank, said cover having a substantially cone-like shape, a hollow cylindrical portion disposed at the top of said cover, a gas opening located substantially at the center of the cylinder portion, a ballast tank located on said cover, said ballast tank comprising a plurality of isolated compartments, said compartments adapted to contain a fluid, spacing means mounted on said ballast tank for providing minimum spacing between the edges of said cover and the walls of said tank when said cover is stationary, rotating or moved vertically, first blade means positioned within said cylindrical portion and facing in a given direction, second blade means disposed within said cylindrical porton and facing in an opposite direction, drive means mounted on said cover for driving said blade means, whereby the blade means are adapted to be positioned at the surface of the material within the tank by selecting the amount of fluid within said ballast tank and said cover rotates when the blade means are driven so that the substantially entire exposed surface of the material is agitated by said blade means which prevent the formation of scum material thereon and gases released from the agitated scum material are withdrawn through said gas opening means.

21. In a digester tank in which waste material is to be contained, a rotatable tank cover, paddle wheel means rotatably mounted on the underside of said cover and disposed to contact the material within the tank, means for rotating said paddle wheel means, whereby said paddle wheel means agitates the surface of the material.

22. In a digester tank as set forth in claim 21, wherein said paddle wheel means are disposed along at least one radius of said cover.

23. In a digester tank as set forth in claim 21, wherein said cover is positioned vertically so that said paddle wheel means are arranged partially above and partially below said surface, said paddle wheel means being elongated sufficiently to agitate substantially the entire waste surface during one complete revolution of said cover, said paddle wheels when rotated imparting a rotating force to said cover.

24. In a digester tank in which waste material is deposited, the material characterized by a tendency of scum material to form at the surface thereof, a tank cover having an upper non-metallic layer, a lower non-metallic layer, and a layer of foam-like material disposed between said upper and lower layers so that the cover floats on the surface of the material within the tank, said cover having a substantially cone-like shape, a gas opening located substantially at the center of said cover, a ballast tank located on said cover, said ballast tank comprising a plurality of isolated compartments, said compartments adapted to contain a fluid, spacing means mounted on said cover for providing minimum spacing between the edges of said cover and the walls of said tank when said cover is stationary, rotating or moving vertically, first paddle wheel means rotatably mounted on the underside of said cover, second paddle wheel means mounted on the underside of said cover, means mounted on said cover for rotating said first paddle wheel means in one direction and rotating said second paddle wheel means in an opposite direction, said first and second paddle wheel means being adapted to be positioned at the surface of the material within the tank by filling said ballast tank with a predetermined amount of fluid and whereby said cover rotates when said first and second paddle wheel means are rotated so that the entire exposed surface of the material is agitated by said paddle wheel means to prevent the formation of scum material thereon and whereby gases released from the agitated scum material are withdrawn through said gas opening means.

25. In a digester tank in which material is deposited, the material characterized by a tendency of a scum blanket to form at the surface thereof, a tank cover adapted to be rotated, means for rotating said tank cover and for breaking up of the scum blanket to prevent the formation thereof, and said cover floating on the material within the tank.

26. In combination with a digester tank, a rotatable tank cover, means for rotating said cover, means affixed to the underside of said cover for agitating the top surface of the material within the tank and being carried in circular paths spaced from and concentric with the axis of cover rotation, said paths including regions near the outer parts of said tank, said agitating means agitating at any instant only a fraction of the total area of the top surface of material within the tank but agitating substantially the entire material surface during one complete revolution of said cover.

27. The method of breaking up the scum blanket which forms on the top surface of the material within a digester tank comprising agitating at one instant a fraction of the top surface area, including agitating areas spaced from the center of the tank and areas near the outer portion of said tank, subsequently moving the agitated areas in circular horizontal paths about the center of the tank so that substantially the entire upper surface is agitated after the agitated areas return to their initial instant positions.

28. The method of breaking up the scum blanket which forms on the top surface of the material within a digester tank comprising forcing the scum which accumulates on the entire surface of the material to at least one predetermined location delivering material to a position above said predetermined location and allowing it to fall thereon so that it agitates the surface of said material at said location.

29. In a digester tank for containing material whereupon a scum blanket tends to form, a substantially cone-shaped tank cover adapted to be rotated, forcing means mounted on the underside of said cover for forcing the forming scum material to at least one predetermined location at the surface of the material in the tank, and means for emitting material above the surface of material in the tank and substantially in the predetermined location of the tank where the scum material is forced by said forcing means.

30. A digester tank as set forth in claim 29 wherein said means for forcing comprises a depending spiral vane having one end located at the periphery of said cover and its other end terminating near the center of said tank.

References Cited by the Examiner

UNITED STATES PATENTS

| | | | |
|---|---|---|---|
| 1,838,475 | 12/1931 | Buswell | 210—13 |
| 1,989,589 | 1/1935 | Fischer et al. | |
| 2,538,412 | 1/1951 | Cecil et al. | |
| 2,614,717 | 10/1952 | Wiggins | 220—26 |
| 3,049,261 | 8/1962 | Wade et al. | 220—26 |

WALTER A. SCHEEL, *Primary Examiner.*

J. M. BELL, *Assistant Examiner.*